Feb. 9, 1926.
C. J. BRANCH
1,572,636
ADJUSTABLE PIPE HANGER
Filed March 29, 1924
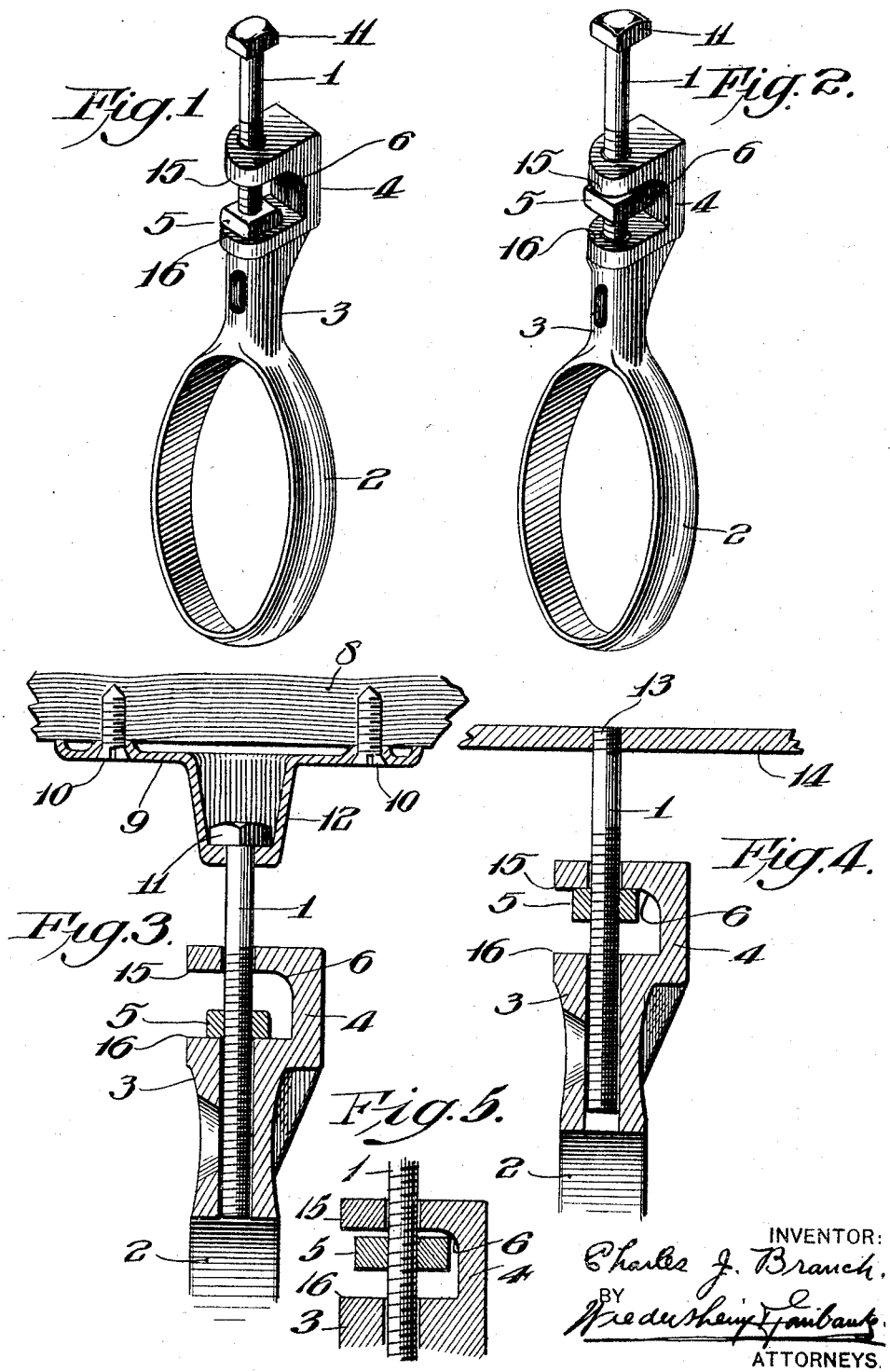
INVENTOR:
Charles J. Branch.
BY
ATTORNEYS.

Patented Feb. 9, 1926.

1,572,636

UNITED STATES PATENT OFFICE.

CHARLES J. BRANCH, OF PHILADELPHIA, PENNSYLVANIA.

ADJUSTABLE PIPE HANGER.

Application filed March 29, 1924. Serial No. 702,934.

*To all whom it may concern:*

Be it known that I, CHARLES J. BRANCH, a citizen of the United States, residing at Philadelphia, in the county of Philadelphia and State of Pennsylvania, have invented a certain new and useful Adjustable Pipe Hanger, of which the following is a specification.

This invention, generally stated, relates to means for supporting overhead pipe lines and has more particularly relation to a pipe hanger which may be adjusted toward and away from a wall, ceiling, or other fixed support to which it is attached.

The leading objects of the present invention may be said to reside in the providing of a pipe hanger of simple, efficient and inexpensive construction; which may be readily adjusted so as to be moved toward or away from a fixed support; and in which the adjusting nut may be locked against rotary movement. Other and further objects reside in the providing of general details of construction and arrangement and combination of parts for effecting the results sought by the said leading objects. Still other objects not at this time appearing will be hereinafter referred to.

The invention consists of the novel construction hereinafter described and finally claimed.

The nature, characteristic features and scope of the invention will be more fully understood from the following description taken in connection with the accompanying drawings forming part hereof, and in which:

Figure 1, is a perspective view of a pipe hanger embodying features of invention and showing the same in position for vertical adjustment.

Figure 2, is a similar view illustrating the nut locked against vertical adjustment, due to vibration.

Figure 3, illustrates in central section a pipe hanger embodying the features of the invention and showing one means of suspension therefor.

Figure 4, is a similar view illustrating a modified form of suspension, and

Figure 5, is a view in cross section illustrating the nut turned from the position seen in Fig. 4.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the numeral 1 designates a bolt adapted to be supported by a wall, ceiling, or other fixed support. The lower threaded end of this bolt 1 is adapted to pass freely through an aperture of the pipe hanger proper. In other words, the bolt 1 does not have threaded relation with the pipe hanger. The pipe hanger is shown as comprising a ring 2 to support a pipe (not shown in the drawings) which ring 2 terminates in a neck portion 3 having formed integral with which is a bifurcated head 4. Having threaded relation with the bolt 1 is a nut 5 for connecting the hanger head with respect to the bolt. In Figure 1 the parts are positioned so that by rotating the nut 5 in a proper direction the hanger may be moved toward or away from its support. In Figure 2 the nut 5 is locked against rotation. When the nut is locked against rotation it is understood that the ring 2 when a pipe is positioned therein, is also held against rotation due to vibration or the like. In order to prevent rotation of said nut, the rear wall of the head 4 is provided with a rounded portion 6. When the parts are in the position shown in Figure 2 with the nut 5 abutting against the top of the head, said rounded portion 6 functions to maintain the nut 5 against rotation. In Figure 3, the bolt 1 is shown as being supported by means of screws 10 from the lathing, studding, sheathing or other overhead support, and the head 11 of bolt 1 is seated within the tapering extension 12 of fitting 9. In Figure 4 the bolt 1 is provided with a threaded end 13 which may be screwed into a wall, ceiling, concrete insert, expansion shield or other equivalent support 14.

Referring now more particularly to the bifurcated head construction it is to be noted that the distance between the ledges 15 and 16 thereof is of a dimension in excess of the thickness of nut 5. Thus by raising the hanger to the position shown in Figure 1, the nut 5 abuts upon ledge 16 and may be rotated. By lowering the hanger to the position shown in Figure 2, the nut 5 abuts against ledge 15 and is locked against rotation due to vibration or the like by the rounded shoulder 6 when the pipe is positioned in the ring 2. It will be understood that the nut when in the position seen in Figures 2 and 4 has its upper surface in contact with the bottom wall of the ledge 15, and is incapable of accidental rotation, due to vibration or the like, since the apex of the angles formed by the nut walls will contact with the rounded shoulder 6 and thus be prevented from accidental rotation.

The application of sufficient force to the nut as by a wrench however enables the nut to be readily rotated for adjusting purposes since said apices can then be caused to ride past said curved shoulder 6, during which operation the nut will move downwardly a slight distance as seen in Fig. 5.

It will be understood that in lieu of the bolt 1, I may employ an elongated rod or stud threaded at both ends and provided with an upper and lower nut, or if desired in lieu of the construction seen in Figure 4, I may employ a stud threaded at its lower end and having its upper end both pointed and threaded to engage an expansion shield or into a wooden or other support.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:

In a device of the character stated, the combination of a support, a threaded rod carried thereby, a nut threaded upon said rod, a pipe hanger having a bifurcated and an apertured head through which said bolt has free passage, said nut being accommodated within said bifurcated portion, which latter is of a dimension in excess of the thickness of said nut, and an upper curved locking shoulder for said nut.

In testimony whereof, I have hereunto signed my name.

CHARLES J. BRANCH.